US007826369B2

(12) United States Patent
Filsfils et al.

(10) Patent No.: US 7,826,369 B2
(45) Date of Patent: Nov. 2, 2010

(54) SUBSETS OF THE FORWARD INFORMATION BASE (FIB) DISTRIBUTED AMONG LINE CARDS IN A SWITCHING DEVICE

(75) Inventors: Clarence Filsfils, Brussels (BE); Pradosh Mohapatra, Fremont, CA (US); Dheerendra Talur, San Ramon, CA (US); John H. W. Bettink, San Jose, CA (US); Pranav Dharwadkar, San Jose, CA (US); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 27 days.

(21) Appl. No.: 12/390,391

(22) Filed: Feb. 20, 2009

(65) Prior Publication Data

US 2010/0215047 A1    Aug. 26, 2010

(51) Int. Cl.
G01R 31/08 (2006.01)
H04L 12/50 (2006.01)
H04L 12/28 (2006.01)

(52) U.S. Cl. .................. 370/235; 370/383; 370/389; 370/401

(58) Field of Classification Search ............... 370/235, 370/383, 389, 401
See application file for complete search history.

(56) References Cited

U.S. PATENT DOCUMENTS

| | | | |
|---|---|---|---|
| 6,735,198 B1 | 5/2004 | Edsall et al. | |
| 7,292,569 B1 | 11/2007 | Smith et al. | |
| 7,499,447 B2 | 3/2009 | Shenoy et al. | |
| 2006/0140185 A1* | 6/2006 | Norman et al. | 370/389 |
| 2009/0109852 A1* | 4/2009 | Grover et al. | 370/235 |
| 2009/0129380 A1* | 5/2009 | Paul et al. | 370/389 |
| 2010/0043067 A1* | 2/2010 | Varadhan et al. | 726/13 |

OTHER PUBLICATIONS

Francis et al, "FIB Suppression with Virtual Aggregation and Default Routes," draft-francis-idr-intra-va-01.txt, Internet EngineeringTask Force, Sep. 15, 2008, 33 pages.
Rekhter et al., "Cisco Systems' Tag Switching Architecture Overview," RFC 2105, The Internet Society, Feb. 1997, 13 pages.
Trotter, "Terminology for Forwarding Information Base (FIB) based Router Performance," RFC 3222, The Internet Society, Dec. 2001, 15 pages.

* cited by examiner

*Primary Examiner*—Huy D Vu
*Assistant Examiner*—Brandon Renner
(74) *Attorney, Agent, or Firm*—The Law Office of Kirk D. Williams

(57) ABSTRACT

Disclosed are, inter alia, methods, apparatus, computer-storage media, mechanisms, and means associated with subsets of the Forward Information Base (FIB) distributed among line cards in a switching device; especially wherein one or more of the line cards does not contain the complete FIB, and this line card forwards packets, for which it does not have the forwarding information, to another line card which has the forwarding information for the packet.

23 Claims, 8 Drawing Sheets

SUBSETS OF THE FORWARD INFORMATION BASE (FIB) DISTRIBUTED AMONG LINE CARDS IN A SWITCHING DEVICE

TECHNICAL FIELD

The present disclosure relates generally to communications and computer systems, especially, packet switching systems (e.g., routers).

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Some current day routers use a distributed forwarding architecture for determining how to forward packets. A centralized route processor communicates with route processors on other routers using known routing protocols to discover the topology of the network and to build a routing table of routes for the network. Based on this routing table, the route processor produces a Forwarding Information Base (FIB) which includes forwarding information for all preferred routes in the routing table. The complete FIB is then distributed to every line card of the router, and each line card maintains a complete copy of the FIB. Each line card performs forwarding lookup operations on their local copy of the complete FIB to determine how to forward packets. For example, an ingress forwarding lookup operation is performed, based on a packet received from an external device, to determine the line card (and possibly port and other information) from which to forward the packet. The packet is then sent through the router to that line card. In one architecture, an egress forwarding lookup operation is also performed on the local copy of the complete FIB for determining how (e.g., from which port, other characteristics) to forward the packet from that line card to an external device. Note, in a current distributed forwarding architecture, a packet that is received from another line card can be forwarded to a device external to the router, but it cannot remain in the router and be forwarded to another line card.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DESCRIPTION OF EXAMPLE EMBODIMENTS

1. Overview

Figure 1:
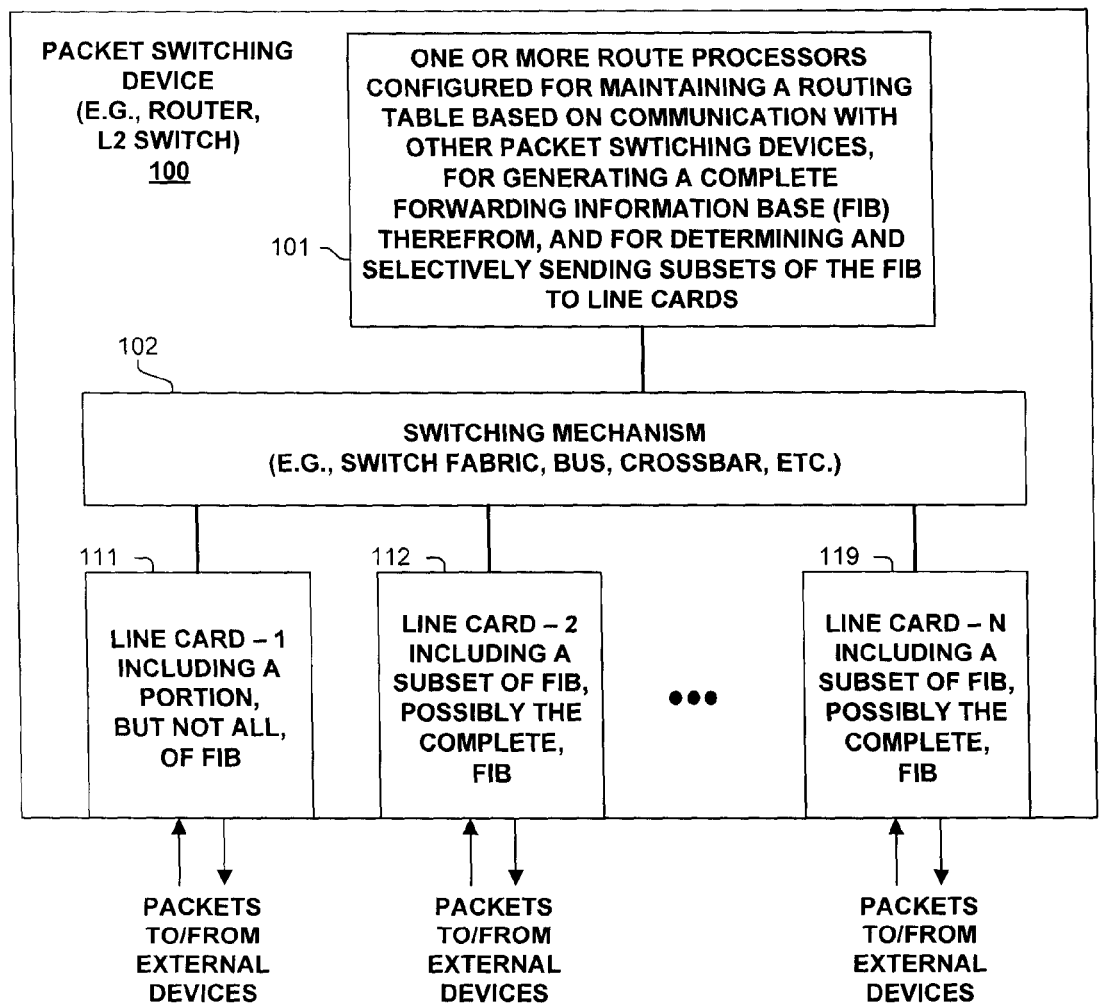
FIG. 1 illustrates a packet switching device operating according to one embodiment.

Disclosed are, inter alia, methods, apparatus, computer-storage media, mechanisms, and means associated with subsets of the Forward Information Base (FIB) distributed among line cards in a switching device; especially wherein one or more of the line cards does not contain the complete FIB, and this line card forwards packets, for which it does not have the forwarding information, to another line card which has the forwarding information for the packet.

One embodiment includes a method performed by a packet switching device, including a plurality of line cards, for forwarding packets based on a Forwarding Information Base (FIB) for the entire packet switching device. In one embodiment, the method includes: forwarding a packet to a second line card of the plurality of line cards in response to performing a first FIB lookup operation in a first portion, but less than all, of the FIB stored in a first line card of the plurality of line cards based on the packet received by the first line card from a device external to the packet switching device, with the result of the first FIB lookup operation being a redirection to perform a FIB lookup on the second line card as the forwarding information for the packet is not located within the first portion of the FIB; forwarding the packet to a third line card of the plurality of line cards in response to the second line card performing a second FIB lookup operation in a subset of the FIB stored in the second line card based on the packet with the result of the second FIB lookup operation identifying to forward the packet from the third line card; and forwarding the packet from the third line card to an external device; wherein each of the plurality of line cards is configured for sending and receiving packets with devices external to the packet switching device; wherein each of the plurality of line cards includes at least a portion of the FIB; and wherein the FIB is derived from a routing table generated by the packet switching device as a result of communication with other packet switching devices.

2. Description

Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable media containing instructions. One or multiple systems, devices, components, etc. may comprise one or more embodiments, which may include some elements or limitations of a claim being performed by the same or different systems, devices, components, etc. The embodiments described hereinafter embody various aspects and configurations within the scope and spirit of the invention, with the figures illustrating exemplary and non-limiting configurations. Note, computer-readable media and means for performing methods and processing block operations are disclosed and are in keeping with the extensible scope and spirit of the invention.

Note, the steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of read the value, process said read value—the value must be obtained prior to processing it, although some of the associated processing may be performed prior to, concurrently with, and/or after the read operation). Also note, nothing described or referenced in this document is admitted as prior art to this application unless explicitly so stated.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Moreover, the phrases "based on x" and "in response to x" are used to indicate a minimum set of items "x" from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. Moreover, the term "or" is used herein to identify a selection of one or more, including all, of the conjunctive items. Additionally, the transitional term "comprising," which is synonymous with "including," "containing," or "characterized by," is inclusive or open-ended and does not exclude additional, unrecited elements or method steps.

Disclosed are, inter alia, methods, apparatus, computer-storage media, mechanisms, and means associated with subsets of the Forward Information Base (FIB) distributed among line cards in a switching device; especially wherein one or more of the line cards do not contain the complete FIB. These line cards without the complete FIB forward packets, for which they do not have the forwarding information, to another line card which has the requisite forwarding information for the packet. In this manner, when the size of the complete FIB exceeds the memory size available for storing the complete FIB in a particular line card, the particular line card still can be used in an efficient manner by populating it with a portion (e.g., less than all of the complete FIB), and then redirecting packets for which it does not have forwarding information to another line card. Especially if the portion of the FIB stored on a line card is allocated smartly, a significant number of FIB lookup operations will result in the needed forwarding information being located on the line card; hence, reducing the additional overhead of multiple ingress FIB lookups on multiple line cards and reducing the latency of a packet within the packet switching system. Additionally, to allow packets to be sent to another line card and to receive a new ingress lookup operation, the architecture of a previous router is modified to add a U-Turn mechanism to allow such an ingress FIB lookup operation to be performed on packets received from another line card via the router's switching mechanism.

The selection of the routing information stored in the limited resource of the locally stored, less than complete FIB will affect the performance of packet processing by the packet switching device. Additional time and resources are required to forward a packet to a line card having the complete FIB, or the portion of the FIB required for forwarding of the packet, as well as to perform one more additional FIB lookup operations. Therefore, the portion, but less than all, of the FIB stored in local FIB is typically allocated in a manner to provide faster service to certain packets.

Such allocation can be made based on a policy decision (e.g., which customer; class of service, priority or type of traffic, etc.) and/or on traffic patterns (e.g., the traffic load of certain packets) in one embodiment. For example, one embodiment identifies premium customer traffic and stores their corresponding routing information in the portion, but less than all, of the FIB stored in local FIB. Therefore, this premium customer traffic will suffer less latency and/or jitter than traffic that is forwarded to another line card for determining its routing information. One embodiment uses autonomous system numbers and/or Border Gateway Protocol (BGP) communities to identify the different policy levels of customer traffic, and provides a mechanism to exchange this policy marking across Internet Service Providers (ISPs).

As discussed herein, it is advantageous in one embodiment to provide an initial lookup operation on a subset of the FIB, but not the complete FIB. Some of these initial lookup operations identify the routing information, and with some of these initial lookup operations identifying to perform a second lookup operation on the entire FIB or a different portion thereof. In one embodiment, these distinct lookup operations are performed on different line cards, which may, for example, allow some line cards which cannot store the entire FIB to continued to be used for the initial lookup operation, with the packet forwarded to another line card to perform a lookup operation on the complete FIB or another determined portion thereof. In one embodiment, these multiple lookup operations are performed on a same line card, which may, for example, allow a faster lookup mechanism which cannot store the entire FIB to be used for the initial lookup operation, with the packet forwarded to another lookup mechanism on the same card to perform a lookup operation on the complete FIB or another determined portion thereof.

On embodiment includes a method performed by a packet switching device, including a plurality of line cards, for forwarding packets based on a Forwarding Information Base (FIB) for the entire packet switching device, the method comprising: forwarding a packet to a second line card of the plurality of line cards in response to performing a first FIB lookup operation in a first portion, but less than all, of the FIB stored in a first line card of the plurality of line cards based on the packet received by the first line card from a device external to the packet switching device, with the result of the first FIB lookup operation being a redirection to perform a FIB lookup on the second line card as the forwarding information for the packet is not located within the first portion of the FIB; forwarding the packet to a third line card of the plurality of line cards in response to the second line card performing a second FIB lookup operation in a subset of the FIB stored in the second line card based on the packet with the result of the second FIB lookup operation identifying to forward the packet from the third line card; and forwarding the packet from the third line card to an external device; wherein each of the plurality of line cards is configured for sending and receiving packets with devices external to the packet switching device; wherein each of the plurality of line cards includes at least a portion of the FIB; and wherein the FIB is derived from a routing table generated by the packet switching device as a result of communication with other packet switching devices.

In one embodiment, the redirection explicitly identifies the second line card. In one embodiment, the second line card stores the complete FIB. In one embodiment, the FIB contains all known routes that exist in the routing table. In one embodiment, the first line card does not have enough memory to store the complete FIB. In one embodiment, the redirection explicitly identifies the second line card. In one embodiment, the apparatus is a router. One embodiment includes: defining, by one or more route processors, the first portion of the FIB, and providing the first portion of the FIB to the first line card; wherein said one or more route processors stores the complete FIB. In one embodiment, the first portion of the FIB includes or does not include one or more particular routes based on whether or not said particular routes are External Border Gateway Protocol (eBGP) routes for reaching external devices via the first line card from the packet switching device. One embodiment includes: updating the first portion of FIB to include or not to include one or more particular routes based on traffic loads of particular packets redirected from the first line card to perform a FIB lookup on another line card because the forwarding information for said particular packets was not located within the first portion of the FIB. In one embodiment, the first portion of the FIB includes or does not include one or more particular routes based on one or more routing policies associated with autonomous system numbers or Border Gateway Protocol (BGP) Communities associated with said particular routes. In one embodiment, the first portion of the FIB includes or does not include one or more particular routes based on one or more user-defined lists of routes or prefixes.

One embodiment includes a packet switching device, comprising: a plurality of line cards, with each of the plurality of line cards configured for sending and receiving packets with devices external to the packet switching device, with each of the plurality of line cards including at least a portion of a Forwarding Information Base (FIB), with the plurality of line cards including a first line card including a first portion, but less than all, of the FIB, and with the plurality of line cards including a second line card including a particular subset of the FIB; and wherein the first line card is configured: to receive a packet from a device external to the packet switching device; and to perform an ingress FIB lookup operation based on the packet to identify how to forward the packet; wherein the results of said ingress FIB lookup operation for routes not included in the first portion of the FIB include a redirection to the second line card for identifying forwarding information based on said at least a portion of the FIB stored in the second line card; and wherein the second line card is configured to receive a specific packet from the first line card, to identify that the forwarding information for the specific packet was not previously identified.

In one embodiment, the second line card includes a U-Turn mechanism for redirecting particular packets received from another line card of the plurality of line cards via a packet switching mechanism to return to the packet switching mechanism for communicating to a different line card of the plurality of line cards; and wherein the second line card is configured to u-turn the specific packet via the U-Turn mechanism. One embodiment includes: one or more route processors configured for deriving a Forwarding Information Base (FIB) for the entire packet switching device from a routing table generated by the packet switching device as a result of communication with other packet switching devices, and for selectively distributing corresponding subsets of the FIB to the plurality of line cards. One embodiment includes a packet switching mechanism configured for communicating packets between line cards of the plurality of line cards. In one embodiment, said identifying that the forwarding information for the specific packet was not previously identified includes: performing an egress FIB lookup operation, by the second line card, on the specific packet. In one embodiment, the redirection explicitly identifies the second line card. In one embodiment, the second line card stores the complete FIB. In one embodiment, the first line card does not have enough memory to store the complete FIB.

One embodiment includes a packet switching device, comprising: a plurality of line cards, with each of the plurality of line cards being configured for sending and receiving packets with devices external to the packet switching device, with each of the plurality of line cards including at least a portion of a Forwarding Information Base (FIB) derived from a routing table generated by the packet switching device as a result of communication with other packet switching devices, and with the plurality of line cards including a first line card, a second line card, and a third line card; wherein the first line card includes means for forwarding a packet to the second line card in response to performing a first FIB lookup operation in a first portion of the FIB stored in the first line card based on the packet received by the first line card from a device external to the packet switching device, with the result of the first FIB lookup operation being a redirection to perform a FIB lookup on the second line card as the forwarding information for the packet is not located within the first portion of the FIB; and wherein the second line card includes means for forwarding the packet to a third line card in response to the second line card performing a second FIB lookup operation in a subset of the FIB stored in the second line card based on the packet with the result of the second FIB lookup operation identifying to forward the packet from the third line card. In one embodiment, the redirection explicitly identifies the second line card. In one embodiment, the second line card stores the complete FIB.

One embodiment includes a packet switching device including a line card configured for sending and receiving packets with devices external to the packet switching device. The line card includes at least two Forwarding Information Base (FIB) lookup mechanisms, each configured for performing a lookup operation on at least a portion of the FIB derived from a routing table generated by the packet switching device as a result of communication with other packet switching devices.

In one embodiment, a first FIB lookup mechanism of said FIB lookup mechanisms is configured to perform a lookup operation of a first portion, but less than all, of the FIB. In response to identifying that the routing information for a packet is not in the first portion, the line card is configured to trigger a second FIB lookup mechanism of said FIB lookup mechanisms perform a FIB lookup operation for the packet to identify its routing information.

In one embodiment, the first and second FIB lookup operations are simultaneously performed on different portions of the FIB stored locally on the line card. In one embodiment, the first FIB lookup mechanism is faster than the second FIB lookup mechanism. In one embodiment, the first FIB lookup mechanism performs a lookup on a smaller portion of the FIB than the second FIB lookup mechanism. In one embodiment, the second FIB lookup mechanism performs a lookup operation on the entire FIB; while in one embodiment, the second FIB lookup mechanism performs a lookup operation on less than all of the FIB, such as, but not limited to, the portion of the FIB not searched by the first FIB lookup mechanism.

In one embodiment, performing these multiple lookup operations on a same line card includes using a faster first FIB lookup mechanism which cannot store the entire FIB to be used for the initial lookup operation (or one of simultaneous lookup operations), with the packet forwarded to a second FIB lookup mechanism on the same card to perform a lookup operation on the complete FIB or another determined portion thereof. In one embodiment, the second FIB lookup mechanism performs FIB lookup operations on the entire FIB. In one embodiment, the result of the first FIB lookup operation explicitly identifies to perform a second FIB lookup operation; and in one embodiment, identifies an explicit second FIB lookup mechanism with the line card having more than one FIB lookup mechanisms configured for performing a FIB lookup operation subsequent to the first FIB lookup operation (thus allowing partitioning of the FIB further across multiple secondary FIB lookup mechanisms).

In one embodiment, the portion of the FIB included in the first portion is performed based on based on a policy decision (e.g., which customer; class of service, priority or type of traffic, etc.) and/or on traffic patterns (e.g., the traffic load of certain packets). For example, one embodiment identifies premium customer traffic and stores their corresponding routing information in the first portion, but less than all, of the FIB. Therefore, this premium customer traffic will suffer less latency and/or jitter than traffic that requires the second FIB lookup operation on the same line card for determining the packet's routing information. One embodiment uses autonomous system numbers and/or Border Gateway Protocol (BGP) communities to identify the different policy levels of customer traffic, and provides a mechanism to exchange this policy marking across Internet Service Providers (ISPs).

In one embodiment, the second portion on the FIB stored on the line card stores the complete FIB. In one embodiment, the FIB contains all known routes that exist in the routing table. In one embodiment, the first FIB lookup mechanism does not have enough memory to store the complete FIB. In one embodiment, the packet switching device is a router. One embodiment includes: defining, by one or more route processors of the packet switching device, the first portion of the FIB, and providing the first portion of the FIB to the first FIB lookup mechanism; wherein said one or more route processors stores the complete FIB. In one embodiment, the first portion of the FIB includes or does not include one or more particular routes based on whether or not said particular routes are External Border Gateway Protocol (eBGP) routes for reaching external devices via the line card from the packet switching device. One embodiment includes: updating the first portion of FIB to include or not to include one or more particular routes based on traffic loads of particular packets directed to a second FIB lookup mechanism on the line card to perform a second FIB lookup operation because the forwarding information for said particular packets was not located within the first portion of the FIB. In one embodiment, the first portion of the FIB includes or does not include one or more particular routes based on one or more routing policies associated with autonomous system numbers or Border Gateway Protocol (BGP) Communities associated with said particular routes. In one embodiment, the first portion of the FIB includes or does not include one or more particular routes based on one or more user-defined lists of routes or prefixes.

Expressly turning to the figures, FIG. 1 illustrates a packet switching device 100 (e.g., router, layer-2 switch) operating according to one embodiment. As shown, packet switching device 100 includes one or more route processors 101, switching mechanism 102 (e.g., switch fabric, bus, crossbar, etc.), and multiple line cards 111-119 configured for sending and receiving packets with external devices. As understood by one skilled in the art, there are many different configurations of a packet switching device, and FIG. 1 (and the other figures) is an illustration of one or more embodiments. For example, in one embodiment, router processor(s) 101 are communicatively coupled to line cards 111-119 via a mechanism different than the switching mechanism communicatively coupling the data planes of line cards 111-119.

As shown, one or more route processors 101 are configured for maintaining a routing table based on communication with other packet switching devices (e.g., using known routing protocols such as Border Gateway Protocol (BGP), internal BGP (iBGP), external BGP (eBGP), etc.). From this routing table, one or more route processors 101 are configured to generate the Forwarding Information Base (FIB) for packet switching device 100. Typically, one or more route processors 101 provides the complete FIB to each line card 111-119 that has enough memory to store the complete FIB. For line cards that cannot store the complete FIB or in certain embodiments, one or more of line cards 111-119 (e.g., line card 111 in one embodiment) is provided a portion, but not all, of the complete FIB. In one embodiment, one or more of line cards 111-119 (e.g., line cards 112, 119 in one embodiment) will store the complete FIB, and therefore, a line card that does not have the forwarding information in its portion of the FIB can forward the packet to one of these line cards that has the complete FIB. In one embodiment, a line card that does not have the forwarding information in its portion of the FIB forwards the packet to another line card which does not have the complete FIB, but it has the requisite forwarding information for the packet. One embodiment includes the ability to prevent looping of packets between line cards, which, for example, might conceivably occur due to delays in updating one or more portions on the FIBs on different line cards. For example, one such loop prevention technique includes using an bit identifying that the packet is being sent for a full lookup operation with this bit being reset as part of the full lookup operation; by adding different line card hop count information to the packet, etc.

Figure 2:
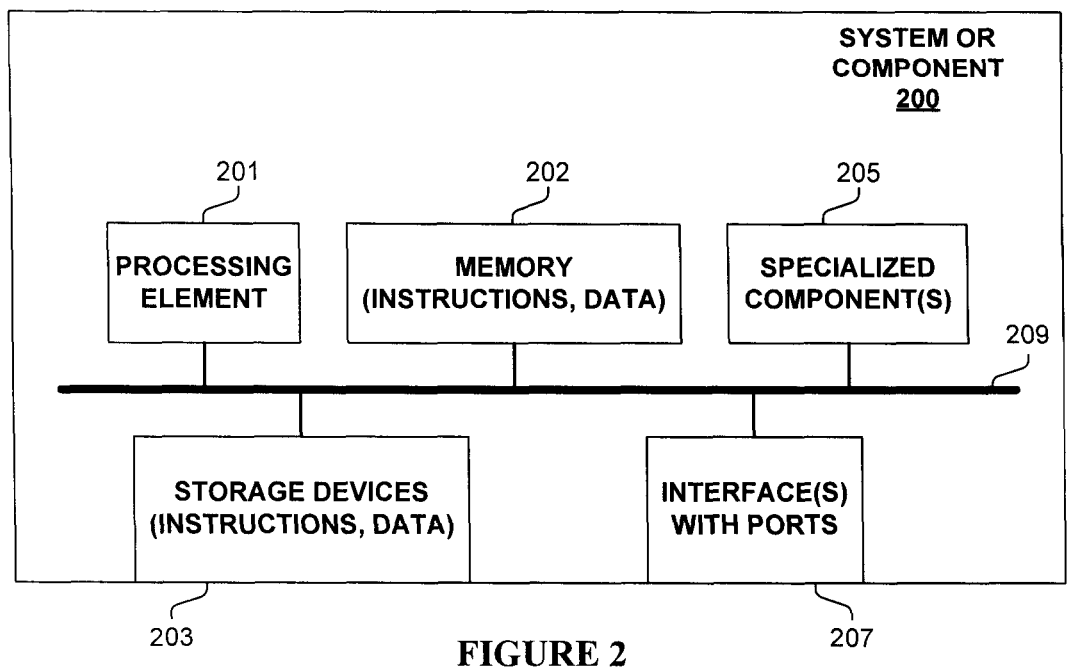
FIG. 2 illustrates an example system or component used in one embodiment.

FIG. 2 illustrates an example system or component used in one embodiment associated with distributing subsets of the FIB among line cards in a switching device; especially wherein one or more of the line cards does not contain the complete FIB, and this line card forwards packets, for which it does not have the forwarding information, to another line card which has the forwarding information for the packet. In one embodiment, system or component 200 performs one or more processes corresponding to one of the flow diagrams illustrated or otherwise described herein.

In one embodiment, system or component 200 includes a processing element 201, memory 202, storage devices 203, and, optionally, specialized components 205 (e.g. optimized hardware, etc.) and/or interfaces with ports 207 for sending and receiving packets, which are typically communicatively coupled via one or more communications mechanisms 209, with the communications paths typically tailored to meet the needs of the application. In one embodiment, interfaces with ports 207 includes one or more U-Turn mechanisms.

Various embodiments of component 200 may include more or less elements. The operation of component 200 is typically controlled by processing element 201 using memory 202 and storage devices 203 to perform one or more tasks or processes. Memory 202 is one type of computer-readable medium, and typically comprises random access memory (RAM), read only memory (ROM), flash memory, integrated circuits, and/or other memory components. Memory 202 typically stores computer-executable instructions to be executed by processing element 201 and/or data which is manipulated by processing element 201 for implementing functionality in accordance with an embodiment. Storage devices 203 are another type of computer-readable medium, and typically comprise solid state storage media, disk drives, diskettes, networked services, tape drives, and other storage devices. Storage devices 203 typically store computer-executable instructions to be executed by processing element 201 and/or data which is manipulated by processing element 201 for implementing functionality in accordance with an embodiment.

Figure 3A:
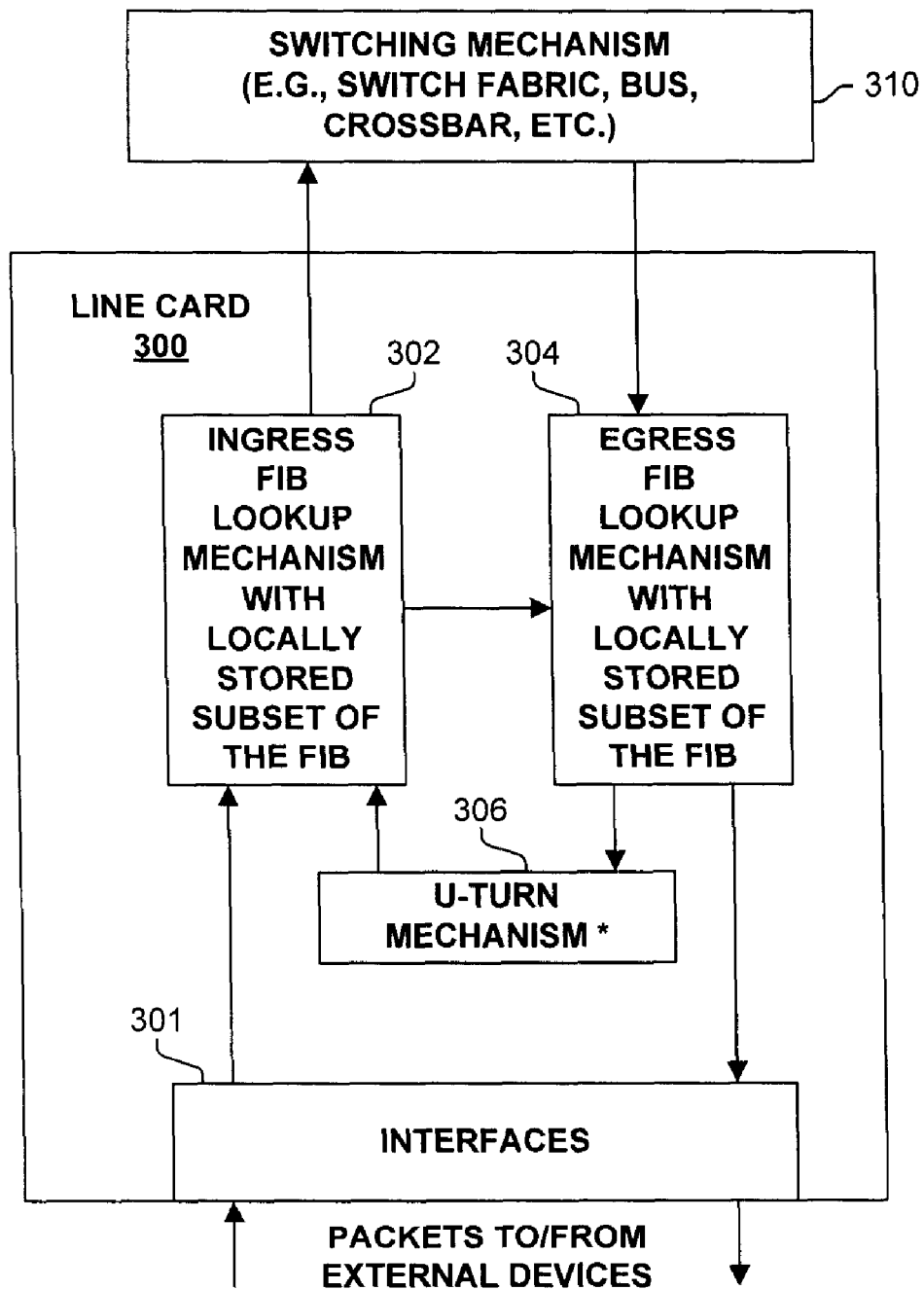
FIG. 3A illustrates a line card of a packet switching device operating according to one embodiment.

FIG. 3A illustrates a portion of a packet switching device operating according to one embodiment. Illustrated is switching mechanism 310 (e.g., switch fabric, bus, crossbar, etc.) configured for communicating packets in the packet switching device between line cards (e.g., including line card 300). Also, shown is line card 300 configured for sending and receiving packets with external devices using interfaces 301.

Line card 300 includes an ingress FIB lookup mechanism 302 to perform an ingress FIB lookup operation based on packets received from external devices (or from U-Turn mechanism 306) in the locally stored subset of the FIB in line card 300. Based on the forwarding information result of the ingress FIB lookup operation for a particular packet, the particular packet is forwarded to another line card (or possibly route processor or other card) via switching mechanism 310, or to egress FIB lookup mechanism 304 configured for performing an egress lookup operation, based on the particular packet in the subset of the FIB stored in line card 300, before the particular packet is sent out of one of interfaces 301 to an external device. In one embodiment, the particular packet is communicated to interfaces 301 from ingress FIB lookup mechanism 302 without going through egress FIB lookup mechanism 304.

For particular packets received by line card 300 from switching mechanism 310, the egress forwarding mechanism typically performs an egress lookup operation based on the packet to determine whether (and possibly how) to forward the packet. In one embodiment, these options are to either u-turn the particular packet via U-Turn mechanism 306 or forward to another device via interfaces 301. In one embodiment, U-Turn mechanism 306 is a physical path and/or storage (e.g., queue) which communicates packets which would otherwise exit line card 300 via interfaces 301 to appear as if these packets arrived on interfaces 301 for normal ingress processing, including an ingress FIB lookup via ingress FIB lookup mechanism 302 as discussed supra.

Figure 3B:
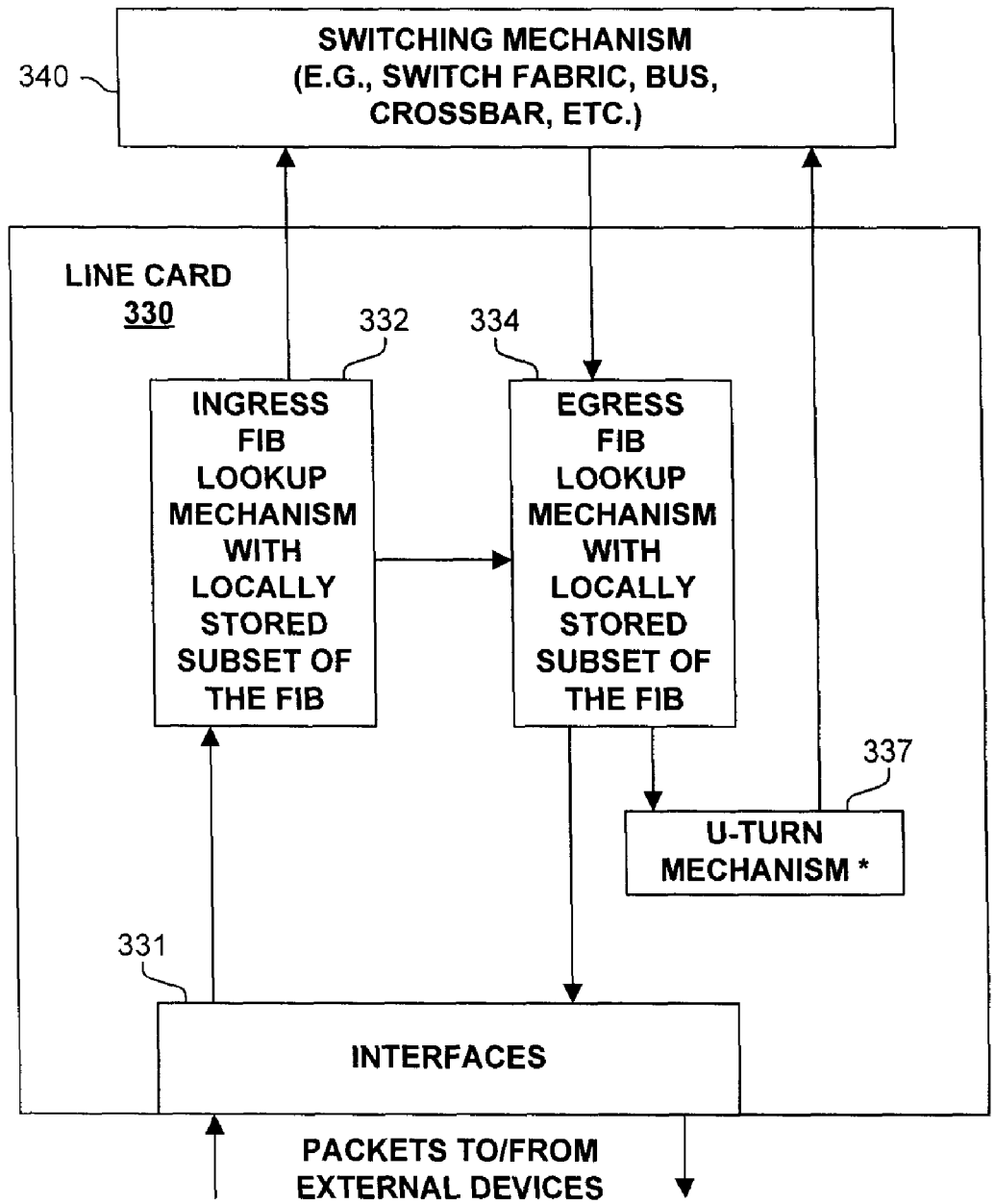
FIG. 3B illustrates a line card of a packet switching device operating according to one embodiment.

FIG. 3B illustrates a portion of a packet switching device operating according to one embodiment. Illustrated is switching mechanism 340 (e.g., switch fabric, bus, crossbar, etc.) configured for communicating packets in the packet switching device between line cards (e.g., including line card 330). Also, shown is line card 330 configured for sending and receiving packets with external devices using interfaces 331. The main difference with the embodiment illustrated in FIG. 3A is that in the embodiment of FIG. 3B, U-Turn mechanism 336 is coupled directly to switching mechanism 340.

Line card 330 includes an ingress FIB lookup mechanism 332 to perform an ingress FIB lookup operation based on packets received from external devices in the locally stored subset of the FIB in line card 330. Based on the forwarding information result of the ingress FIB lookup operation for a particular packet, the particular packet is forwarded to another line card (or possibly the route processor or other line card) via switching mechanism 340, or to egress FIB lookup mechanism 334 configured for performing an egress lookup operation, based on the particular packet in the subset of the FIB stored in line card 330, before the particular packet is sent out of one of interfaces 331 to an external device. In one embodiment, the particular packet is communicated to interfaces 331 from ingress FIB lookup mechanism 332 without going through egress FIB lookup mechanism 334. In one embodiment, the term ingress is used to describe that a packet was received from interfaces 331, and the term egress is used to describe that a packet was received from switching mechanism 340.

For particular packets received by line card 330 from switching mechanism 340, the egress forwarding mechanism typically performs an egress lookup operation based on the packet to determine whether (and possibly how) to forward the packet. In one embodiment, these options are to either: u-turn the particular packet via U-Turn mechanism 336 to switching mechanism 340, or to forward to another device via interfaces 331. In one embodiment, U-Turn mechanism 336 is a physical path and/or storage (e.g., queue) which communicates packets which would otherwise exit line card 330 via interfaces 331 to return to switching mechanism 340 for forwarding to another line card (or other card). In one embodiment, U-Turn mechanism 336 is a physical path and/or storage (e.g., queue) which communicates packets which would otherwise exit line card 330 via interfaces 331 to appear as if these packets arrived on interfaces 331 for normal ingress processing, including an ingress FIB lookup via ingress FIB lookup mechanism 332 as discussed supra.

Figure 3C:
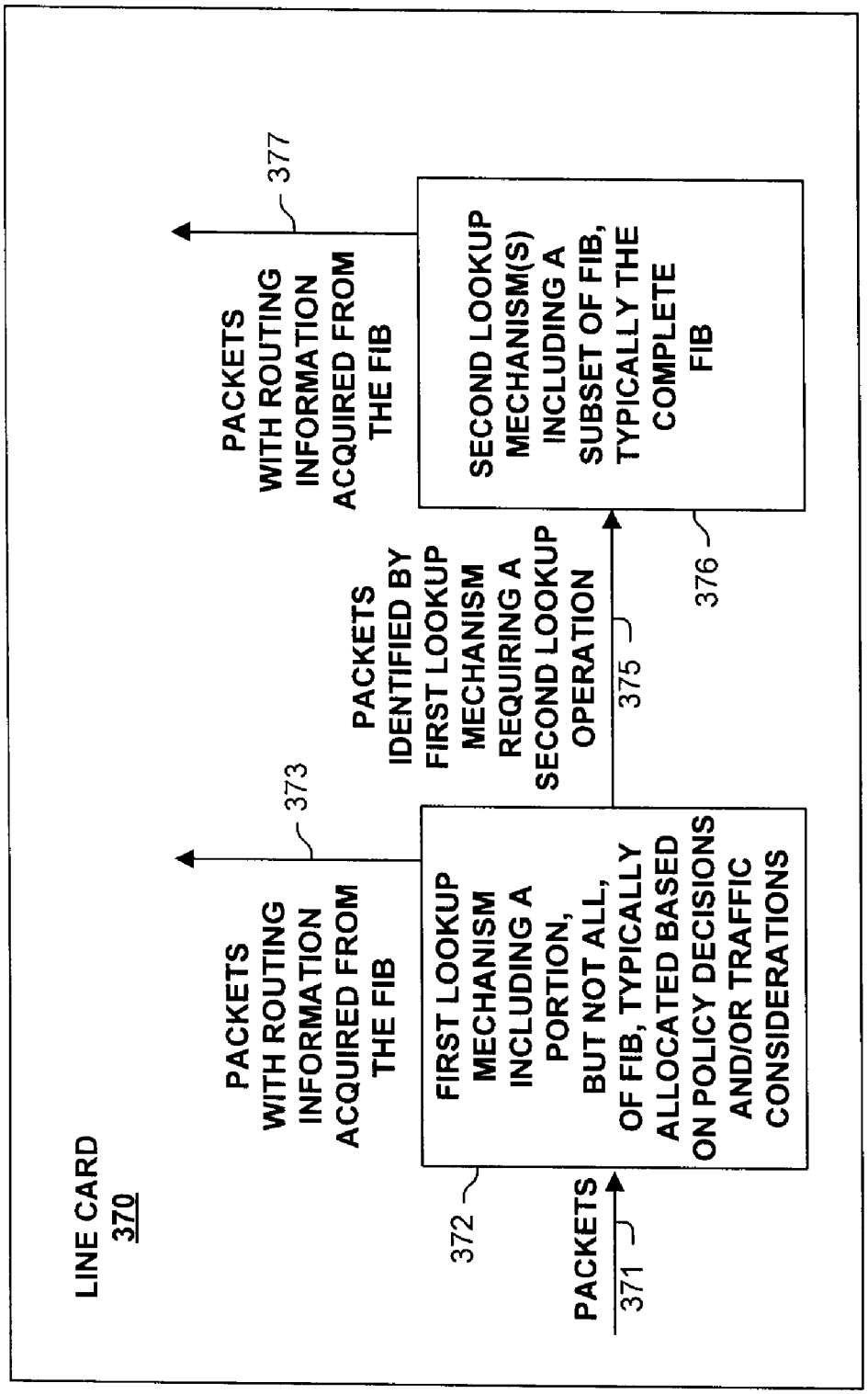
FIG. 3C illustrates a line card of a packet switching device operating according to one embodiment.

FIG. 3C illustrates line card 370 operating according to one embodiment. Line card 370 is configured to send and receive packets with external devices as well as to communicate packets with other line cards. Line card 370 includes a first FIB lookup mechanism 372 configured to perform a lookup operation, based on a packet, of a first portion, but not all, of the FIB. This results in either: the routing information for the packet being discovered with the packet forwarded accordingly (373), or the identification to perform a lookup on the complete FIB or on an identified portion of the FIB stored in one or more of second lookup mechanisms 376. This second lookup operation by a lookup mechanism 376 results in the routing information for the packet being discovered with the packet forwarded accordingly (377).

Figure 4:
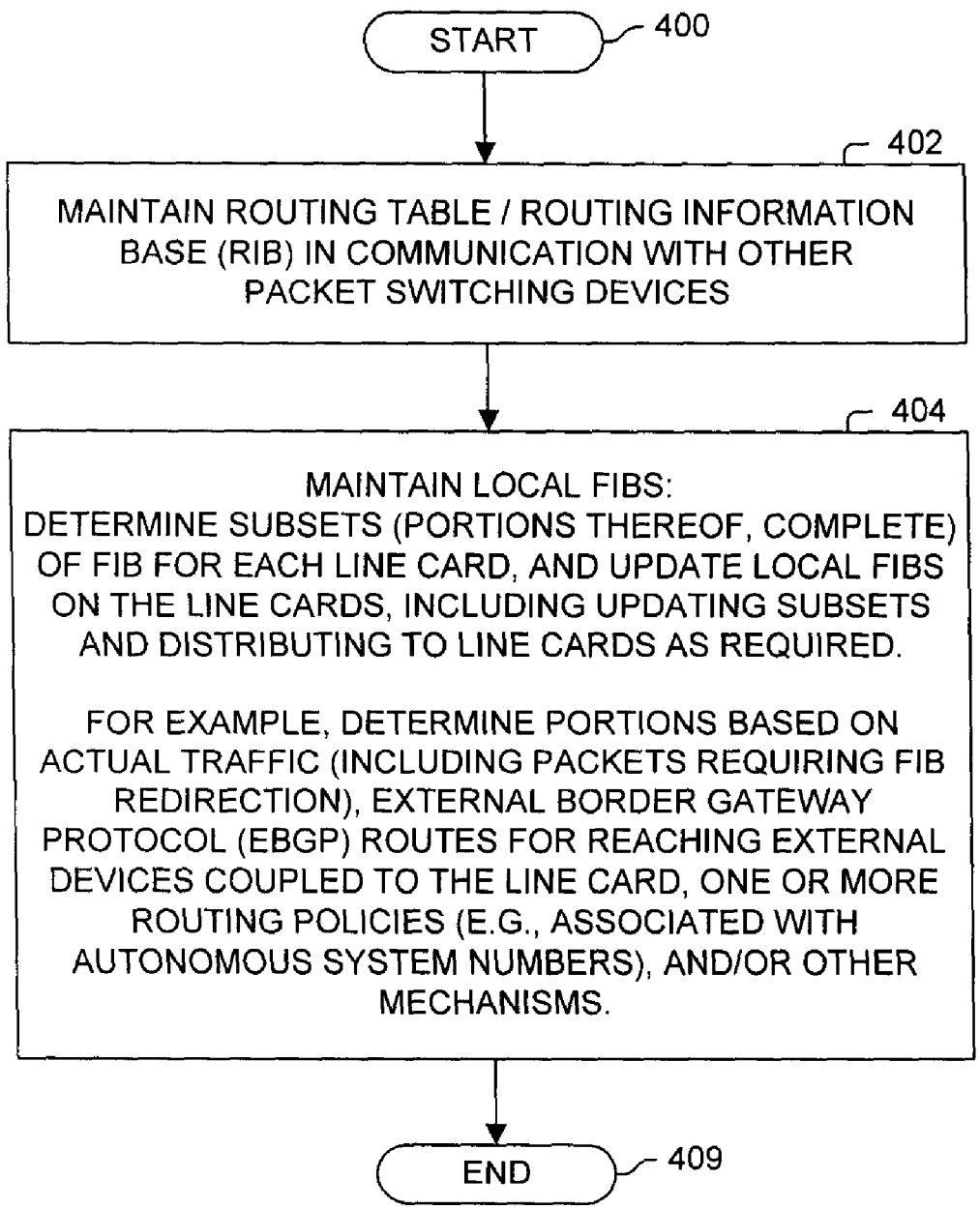
FIG. 4 illustrates a process performed in one embodiment.

FIG. 4 illustrates a process performed in one embodiment. Processing begins with process block 400. In process block 402, a routing table/routing information base (RIB) is maintained using known routing protocols such as Border Gateway Protocol (BGP), internal BGP (iBGP), external BGP (eBGP), etc. Such maintenance includes updating the routing table/RIB as required and as the network changes.

In process block 404, the local subsets of the FIBs are maintained, which includes updating the FIB for the packet switching device, determining what subset of the FIB should be distributed to each line card; and providing local subsets of the FIB to the line cards of the packet switching device. These subsets may be static, or periodically or otherwise updated (such as in response to some event). For example, one embodiment measures packet traffic that is redirected and/or packet traffic that not redirected to another line card or second FIB lookup mechanism, and possibly modify and updates one or more subsets of the FIB based on these measurements in light of the total packet traffic and/or ratio of redirect to non-redirected packet traffic.

Typically, in one embodiment, if a line card has sufficient storage for the complete FIB, then the line card is provided the complete FIB as this eliminates the need for redirecting FIB lookup operations to other line cards.

In one embodiment, for line cards, or FIB lookup mechanisms, within a packet switching system which do not have enough storage (whether actually or allocated for FIB storage) or are otherwise designated not to receive the complete FIB, then their respective portions of the FIB are preferably determined in a manner to reduce the number of redirections required. For example, these portions for each particular line card may be determined in an extensible number of manners, including, but not limited to, being based on actual traffic (including packets requiring FIB redirection), External Border Gateway Protocol (eBGP) routes for reaching external devices coupled to the line card, one or more routing policies (e.g., associated with autonomous system numbers), and/or other mechanisms. In one embodiment, each of the non-complete FIBs stored on line cards include an explicit entry in the non-complete FIB to explicitly define to which line card to forward packets matching a route. This can be accomplished by associating default route(s) and/or aggregate prefixes that cover the subset of FIB information held by the line card having the corresponding forwarding information. Note, determining the partition based on actual traffic (including packets requiring FIB redirection) is not the same as caching routes (e.g., keeping a last referenced number of entries and possibly aging the cached entries). Rather, it is typically performed based on smartly providing the line card with FIB entries corresponding to traffic passing through it and possibly updating the portion of the FIB stored on the line card based on the redirected packets.

Additionally, should the complete FIB be too large to store on any one line card or otherwise in one embodiment, then the FIB is partitioned among the line cards such that each piece of forwarding information is stored at least in one line card, with the FIB on the other line cards programmed to contain corresponding entries to redirect the packets directly to the line card which has the required forwarding information for a packet.

Figure 5A:
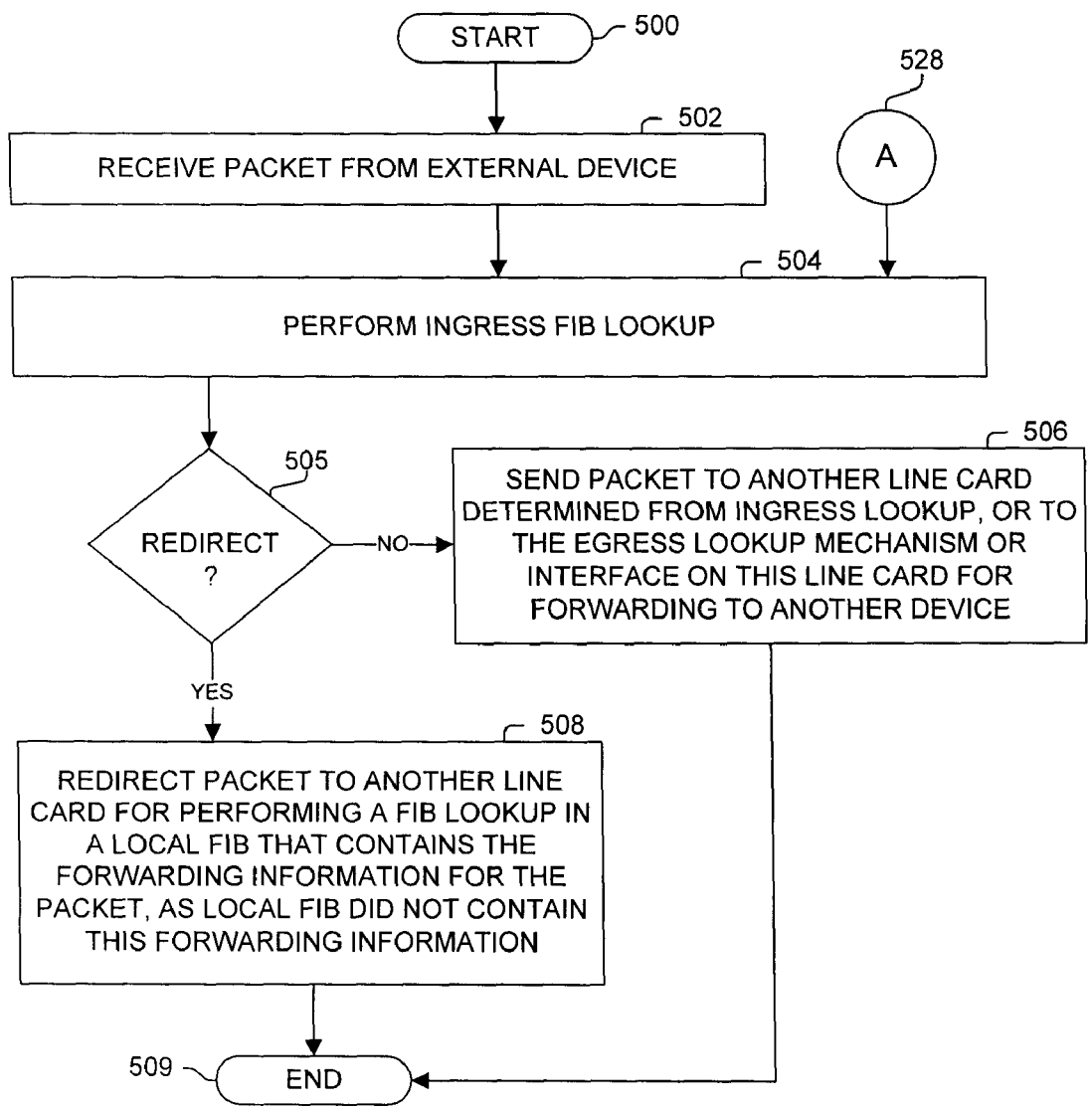
FIGS. 5A and 5B illustrate one or more processes performed in one embodiment.
Figure 5B:
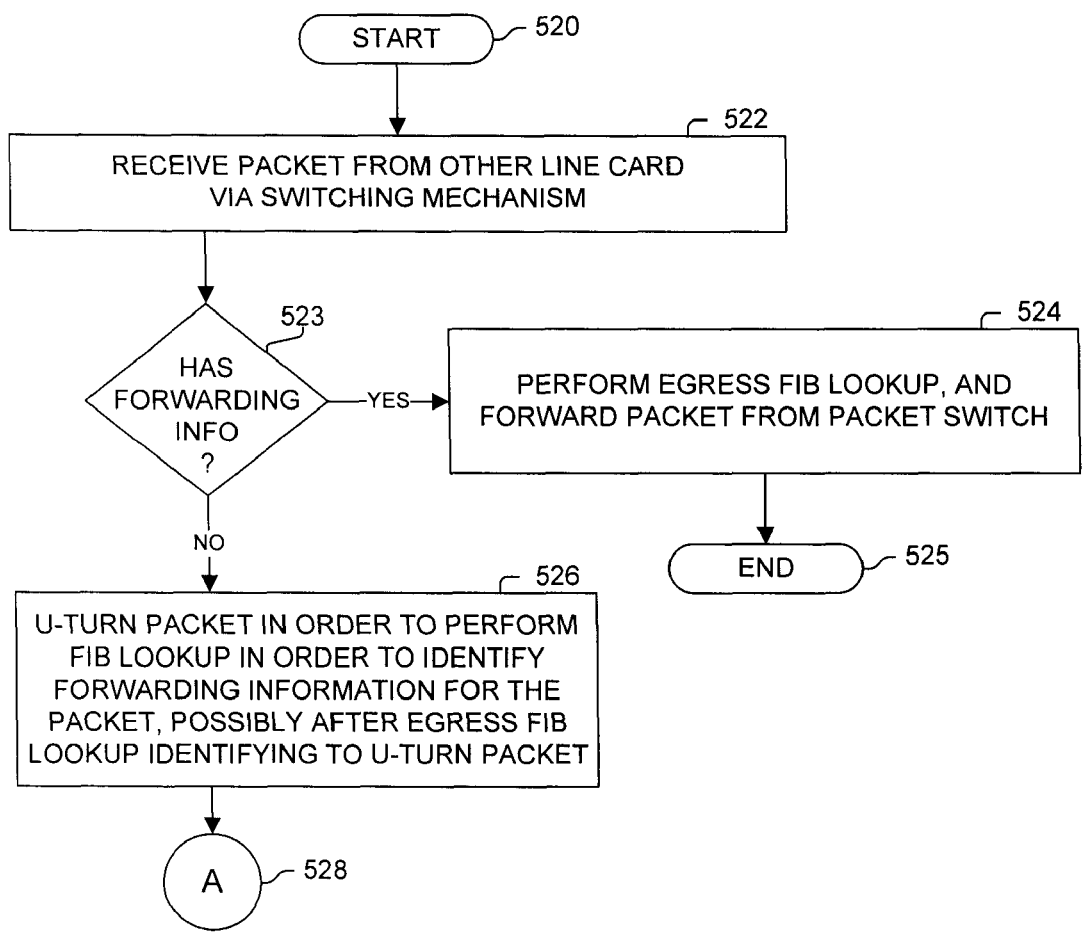

FIGS. 5A and 5B illustrate one or more processes performed in a line card in one embodiment. Processing of FIG. 5A begins with process block 500. In process block 502, a packet is received by the line card from an external device. In process block 504, an ingress FIB lookup is performed on the packet received from an external device (process block 502) or from a U-Turn mechanism (via connector A 528). As determined in process block 505, if the packet is to be redirected to another line card (such as in response to a matching entry explicitly defining the line card to which to redirect the packet or in response to other programming of a default line card to redirect a packet), then in process block 508, the packet is redirected to another line card that preferably contains the forwarding information for the packet in its maintained subset of the FIB for the packet switching device, as the locally stored portion of the FIB did not contain the requisite forwarding information. (Note, it is possible to randomly or otherwise determine the line card to which to redirect the packet, but this will typically waste resources as it might take multiple redirections to arrive at a line card containing the requisite forwarding information in its locally stored portion of the FIB.) Otherwise, in process block 506, the forwarding information for the packet was determined in process block 504, and based on this forwarding information, the packet is sent to another line card, or to the egress lookup mechanism or interface on this line card for forwarding to another device. Processing of the flow diagram of FIG. 5A is complete as indicated by process block 509.

Processing of the flow diagram of FIG. 5B begins with process block 520. In process block 522, a packet is received from another line card via the switching mechanism of the packet switching device. As determined in process block 523, if the forwarding information was previously determined (e.g., in an ingress FIB lookup operation), in process block 524, an egress FIB lookup operation is performed on the packet; the packet is typically subsequently forwarded from the line card to an external device; and processing of the flow diagram of FIG. 5B is complete as indicated by process block 525. Otherwise, in process block 526, the packet is u-turned in order to perform an ingress FIB lookup operation in the line card to identify the forwarding information for the packet. In one embodiment, the result of process block 523 is determined based on an egress FIB lookup operation performed on the packet; and when such egress FIB lookup operation identifies that a u-turn operation should be performed, processing proceeds from process block 523 to process block 526. Processing proceeds from process block 526 via connector A (528) of FIG. 5B to connector A (528) of FIG. 5A.

In view of the many possible embodiments to which the principles of our invention may be applied, it will be appreciated that the embodiments and aspects thereof described herein with respect to the drawings/figures are only illustrative and should not be taken as limiting the scope of the invention. For example, and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method performed by a packet switching device, including a plurality of line cards, for forwarding packets based on a Forwarding Information Base (FIB) for the entire packet switching device, the method comprising:
   redirecting a packet to a second line card of the plurality of line cards in response to performing a first FIB lookup operation for the packet in a first portion of the FIB; wherein the first portion is stored in a first line card of the plurality of line cards, with the entire FIB not being available on the first line card for FIB lookup operations; wherein the packet is received by the first line card from a device external to the packet switching device; wherein the first portion is less than all of the forwarding information in the FIB; and wherein forwarding information for forwarding the packet is not located within the first portion of the FIB;
   forwarding the packet to a third line card of the plurality of line cards in response to the second line card performing a second FIB lookup operation for the packet in a subset of the FIB stored in the second line card, with the result of the second FIB lookup operation identifying to forward the packet from the third line card; wherein the subset of the FIB stored in the second line card includes said forwarding information for the packet; and
   forwarding the packet from the third line card to an external device;
   wherein each of the plurality of line cards is configured for sending and receiving packets with devices external to the packet switching device; wherein each of the plurality of line cards includes at least a portion of the FIB; and wherein the FIB is derived from a routing table generated by the packet switching device as a result of communication with other packet switching devices.

2. The method of claim 1, wherein the redirection explicitly identifies the second line card.

3. The method of claim 1, wherein the second line card stores the complete FIB.

4. The method of claim 3, wherein the FIB contains forwarding information for all known routes that exist in the routing table.

5. The method of claim 3, wherein the first line card does not have enough memory to store the complete FIB.

6. The method of claim 3, wherein the redirection explicitly identifies the second line card.

7. The method of claim 1, wherein the apparatus is a router.

8. The method of claim 1, comprising: defining, by one or more route processors, the first portion of the FIB, and providing the first portion of the FIB to the first line card; wherein said one or more route processors stores the complete FIB.

9. The method of claim 1, wherein the first portion of the FIB includes or does not include forwarding information for one or more particular routes based on whether or not said particular routes are External Border Gateway Protocol (eBGP) routes for reaching external devices via the first line card from the packet switching device.

10. The method of claim 1, comprising: updating the first portion of FIB to include or not to include forwarding information for one or more particular routes based on traffic loads of particular packets redirected from the first line card to perform a FIB lookup on another line card because the forwarding information for said particular packets was not located within the first portion of the FIB.

11. The method of claim 1, wherein the first portion of the FIB includes or does not include forwarding information for one or more particular routes based on one or more routing policies associated with autonomous system numbers or Border Gateway Protocol (BGP) Communities associated with said particular routes.

12. The method of claim 1, wherein the first portion of the FIB includes or does not include forwarding information for one or more particular routes based on one or more user-defined lists of routes or prefixes.

13. A packet switching device, comprising:
a plurality of line cards, with each of the plurality of line cards configured for sending and receiving packets with devices external to the packet switching device, with each of the plurality of line cards including at least a portion of a Forwarding Information Base (FIB), with the plurality of line cards including a first line card including a first portion of the FIB, and with the plurality of line cards including a second line card including a particular subset of the FIB; wherein the first portion includes some, but less than all, of the FIB, with the entire FIB not being available on the first line card for FIB lookup operations; and
wherein the first line card is configured: to receive a packet from a device external to the packet switching device; and to perform an ingress FIB lookup operation, based on the packet, in the first portion of the FIB for identifying how to forward the packet; wherein the first line card is configured to respond to a result of said ingress FIB lookup operation for retrieving forwarding information for a route corresponding to that to be taken by the packet which is not included in the first portion of the FIB, with said response including: a redirection to the second line card for identifying the forwarding information;
wherein the second line card is configured to receive the packet from the first line card, and to perform a FIB lookup operation for the packet on the particular subset of the FIB stored in the second line card for identifying the forwarding information for forwarding the packet.

14. The packet switching device of claim 13, wherein the second line card includes a U-Turn mechanism for redirecting particular packets received from another line card of the plurality of line cards via a packet switching mechanism to return to the packet switching mechanism for communicating to a different line card of the plurality of line cards; and wherein the second line card is configured to u-turn the specific packet via the U-Turn mechanism.

15. The packet switching device of claim 13, comprising: one or more route processors configured for deriving a Forwarding Information Base (FIB) for the entire packet switching device from a routing table generated by the packet switching device as a result of communication with other packet switching devices, and for selectively distributing corresponding subsets of the FIB to the plurality of line cards.

16. The packet switching device of claim 13, comprising a packet switching mechanism configured for communicating packets between line cards of the plurality of line cards.

17. The packet switching device of claim 13, wherein the second line card is configured to identify that the forwarding information for the packet was not previously identified by another line card of the plurality of line cards, with this operation including: performing an egress FIB lookup operation, by the second line card, on the packet.

18. The packet switching device of claim 13, wherein the redirection explicitly identifies the second line card.

19. The packet switching device of claim 13, wherein the second line card stores the complete FIB.

20. The packet switching device of claim 13, wherein the first line card does not have enough memory to store the complete FIB.

21. A packet switching device, comprising:
a plurality of line cards, with each of the plurality of line cards being configured for sending and receiving packets with devices external to the packet switching device, with each of the plurality of line cards including at least a portion of a Forwarding Information Base (FIB) derived from a routing table generated by the packet switching device as a result of communication with other packet switching devices, and with the plurality of line cards including a first line card, a second line card, and a third line card;
wherein the first line card includes means for redirecting a packet to the second line card in response to performing a first FIB lookup operation in a first portion of the FIB stored in the first line card based on the packet received by the first line card from a device external to the packet switching device, with the result of the first FIB lookup operation being a redirection to perform a FIB lookup on the second line card as the forwarding information for the packet is not located within the first portion of the FIB, but the forwarding information is located in the FIB, but the entire FIB is not available on the first line card for FIB lookup operations; and
wherein the second line card includes means for forwarding the packet to a third line card in response to the second line card performing a second FIB lookup operation in a subset of the FIB stored in the second line card based on the packet with the result of the second FIB lookup operation identifying to forward the packet from the third line card, as the forwarding information for the packet is located in the subset of the FIB stored in the second line card.

22. The packet switching device of claim 21, wherein the redirection explicitly identifies the second line card.

23. The packet switching device of claim 22, wherein the second line card stores the complete FIB.

* * * * *